United States Patent
Drader et al.

(10) Patent No.: US 7,144,136 B2
(45) Date of Patent: Dec. 5, 2006

(54) BACKLIGHT CONTROL FOR A HANDHELD COMPUTING DEVICE

(75) Inventors: Marc A. Drader, Kitchener (CA); James Robinson, Elmira (CA); Robert J. Lowles, Waterloo (CA)

(73) Assignee: Research in Motion Limited, Waterloo (*) Notice: Subject to any disclaimer, the term of this patent is extended or adjusted under 35 U.S.C. 154(b) by 114 days.

(21) Appl. No.: 10/858,060

(22) Filed: Jun. 2, 2004

(65) Prior Publication Data
US 2005/0270252 A1 Dec. 8, 2005

(51) Int. Cl.
*F21V 23/04* (2006.01)
*F21V 33/00* (2006.01)

(52) U.S. Cl. .................. 362/295; 362/85; 362/109; 362/276; 362/802

(58) Field of Classification Search ........... 362/561, 362/24, 552, 276, 295, 109, 317, 559, 600, 362/802, 85; 345/30–111
See application file for complete search history.

(56) References Cited

U.S. PATENT DOCUMENTS

| | | |
|---|---|---|
| 5,736,973 A | 4/1998 | Godfrey et al. |
| 7,027,295 B1 * | 4/2006 | Holmes et al. ............. 361/681 |
| 2001/0013854 A1 * | 8/2001 | Ogoro ........................ 345/102 |
| 2004/0012556 A1 | 1/2004 | Yong et al. |
| 2005/0225983 A1 * | 10/2005 | Fornell ....................... 362/276 |

FOREIGN PATENT DOCUMENTS

| | | |
|---|---|---|
| EP | 0 496 383 A2 | 7/1992 |
| EP | 1 202 243 A2 | 5/2002 |

* cited by examiner

*Primary Examiner*—Alan Cariaso
*Assistant Examiner*—Bao Q. Truong
(74) *Attorney, Agent, or Firm*—Heenan Blaikie LLP

(57) ABSTRACT

In a handheld computing device that includes a backlit display having a variable-intensity backlight, and a function key, a method for controlling an intensity of light produced by the backlight involves the steps of (1) setting the intensity to a first level sufficient for viewing information on the display under first ambient lighting; and (2) upon activation of the function key, setting the intensity to a second level sufficient for viewing information on the backlit display under second ambient lighting that is different than the first ambient lighting.

33 Claims, 6 Drawing Sheets

BACKLIGHT CONTROL FOR A HANDHELD COMPUTING DEVICE

FIELD OF THE INVENTION

The invention described herein relates to a mechanism for enhancing the ease of use of a handheld computing device. In particular, the invention described herein relates to a method and system for enhancing the clarity of information presented on a backlit display of a handheld computing device.

BACKGROUND OF THE INVENTION

The conventional handheld computing device, such as a PDA, or a wireless telephone, includes a LCD display for presenting information to the user, and a keyboard or keypad for facilitating data entry by the user. Typically, the LCD display comprises a transmissive LCD panel, and a backlight for enhancing the visibility of the information presented on the LCD panel. The intensity of the light produced by the LCD backlight is set by the manufacturer such that the information presented on the LCD panel is clear at moderate ambient light levels. However, this factory setting often renders the LCD panel difficult to read in dim light (because the backlight is too bright) and strong ambient light (because the backlight is too dim).

In some implementations, instead of a transmissive LCD panel, the LCD display comprises a transreflective LCD panel, and a backlight for enhancing the visibility of the information presented on the LCD panel. Due to the reflective nature of the LCD panel, the clarity of the information presented on the LCD panel is clearest in strong ambient light. Further, the intensity of the light produced by the LCD backlight is set by the manufacturer such that the information presented on the LCD panel is clear at moderate ambient light levels. However, this factory setting often renders the LCD panel difficult to read in dim ambient light (because the backlight is too bright).

Therefore, there is a need for a handheld computing device whose LCD display is readable in strong, moderate and dim ambient light.

SUMMARY OF THE INVENTION

According to the invention described herein, in a handheld computing device that includes a variable-intensity backlight, the intensity of light produced by the backlight is user-selectable.

According to one aspect of the invention described herein, in a handheld computing device that includes a backlit display having a variable-intensity backlight, and a function key, there is provided a method for controlling an intensity of light produced by the backlight that involves the steps of (1) setting the intensity to a first level sufficient for viewing information on the display under first ambient lighting, and (2) upon activation of the function key, setting the intensity to a second level sufficient for viewing information on the backlit display under second ambient lighting that is different than the first ambient lighting.

According to another aspect of the invention described herein, there is provided a handheld computing device that includes a backlit display having a variable-intensity backlight, a function key, and data processing means coupled to the backlit display and the function key. The data processing means is configured to perform the steps of:

(1) setting the intensity to a first level sufficient for viewing information on the display under first ambient lighting; and
(2) upon activation of the fiction key, setting the intensity to a second level sufficient for viewing information on the backlit display under second ambient lighting different than the first ambient lighting.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
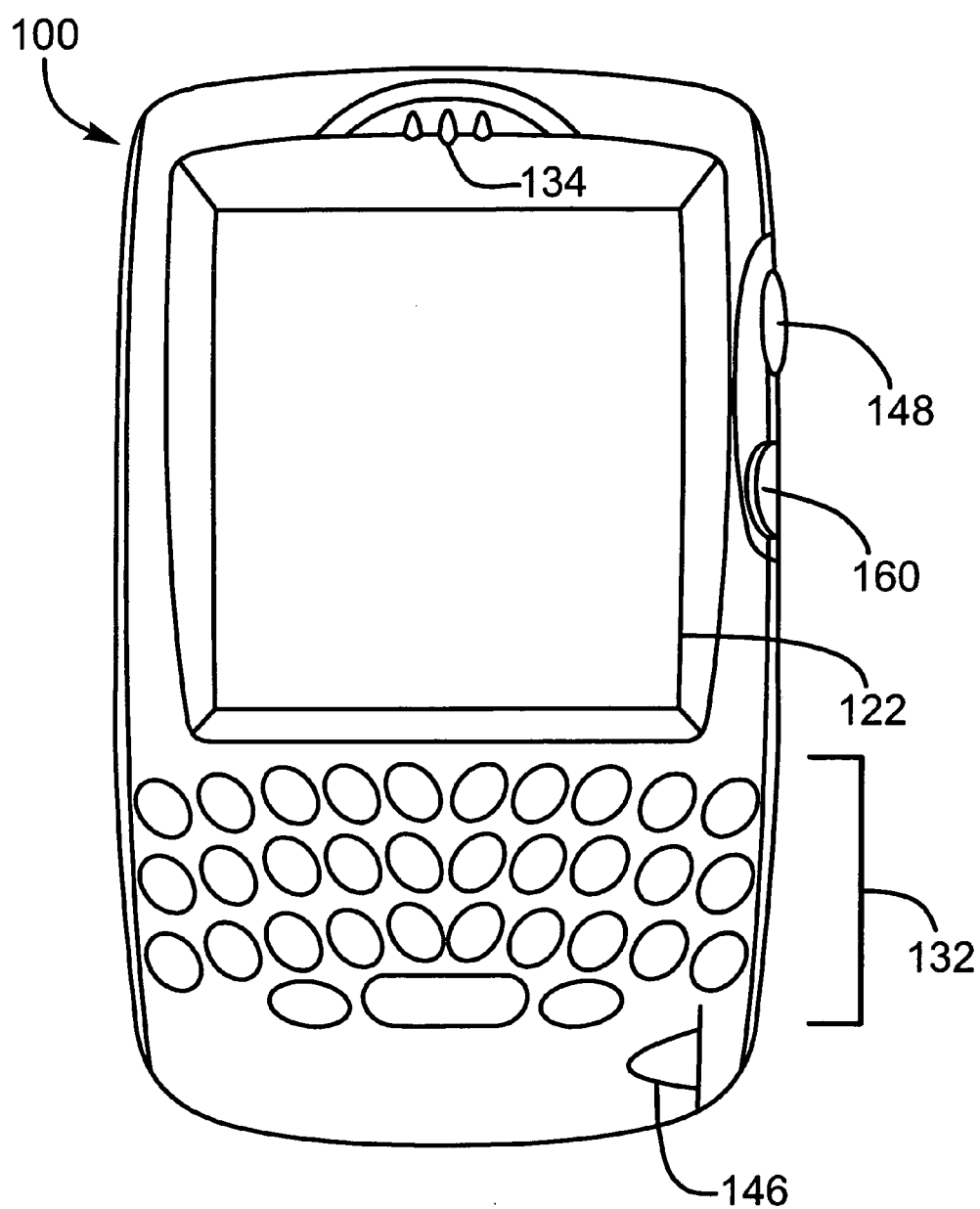
FIG. 1 is a front plan view of a handheld computing device, according the invention described herein.

Referring now to FIG. 1, there is shown a handheld computing device, denoted generally as 100, provided according to one aspect of the invention. The handheld computing device 100 includes a display 122, a function key 146, and data processing means 102 (not shown) disposed within a common housing. The display 122 comprises a backlit display having a variable-intensity backlight.

Figure 2:
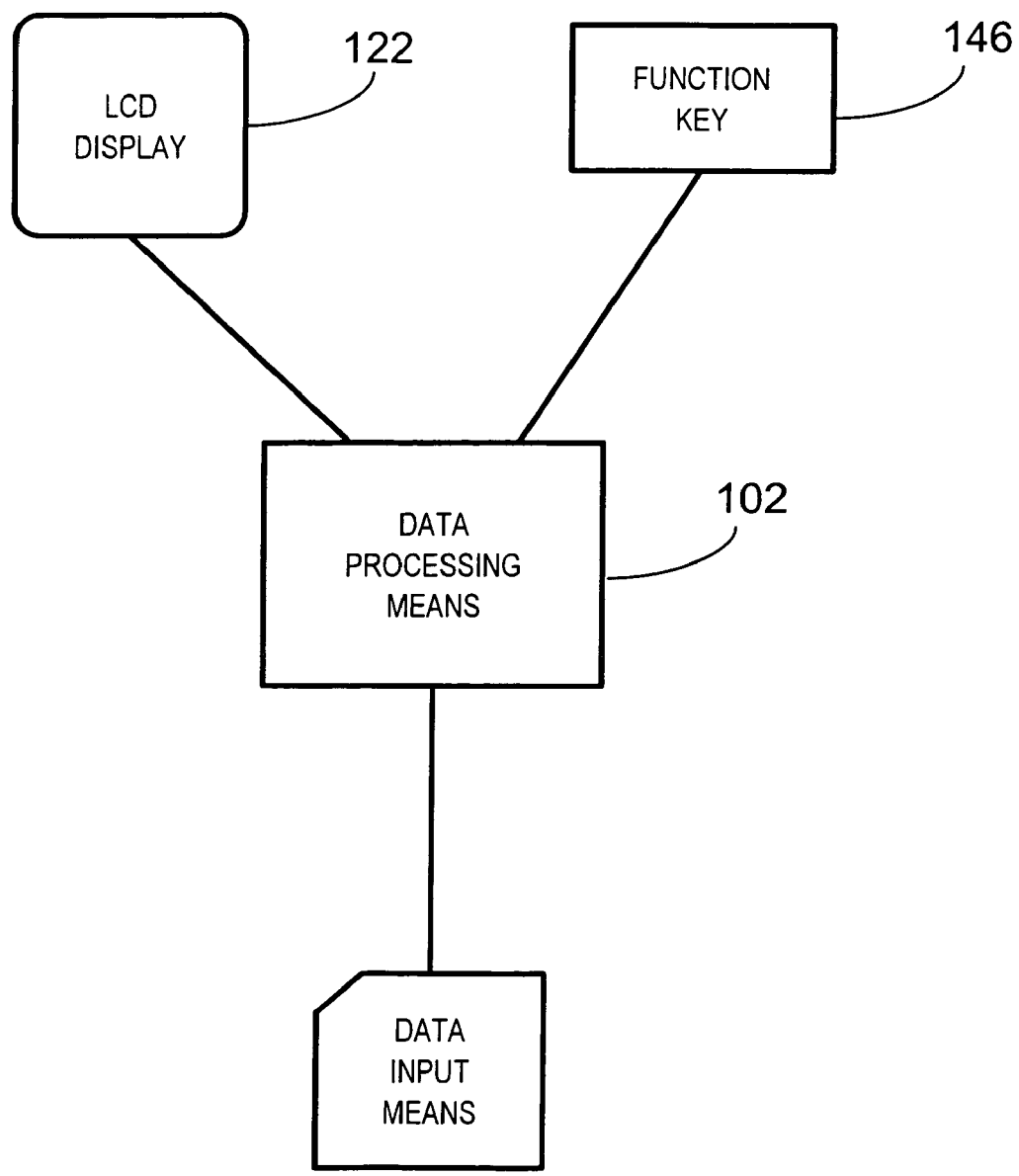
FIG. 2 is a schematic view depicting the communication pathways existing between the data processing means, the LCD display, the function key and the data input means of the handheld computing device depicted in FIG. 1.

In one embodiment, the backlit display 122 comprises a transmissive LCD display, and the function key 146 operates as a power on/off switch Alternately, in another embodiment, the backlit display 122 comprises a reflective or trans-reflective LCD display, and the function key 146 operates as a backlight switch As shown in FIG. 2, the data processing means 102 of the handheld computing device 100 is in communication with the display 122 and the function key 146. As will be described, the data processing means comprises a microprocessor 138, and a memory 124, 126 (disposed within the housing). The memory 124, 126 carries computer processing instructions which, when accessed from the memory 124, 126 and executed by the microprocessor 138, cause the data processing means to perform the method which will be described in further detail below.

In addition to the display 122 and the function key 146, the handheld computing device 100 includes user data input means for inputting data to the data processing means. Further, the data processing means 102 is in communication with the user data input means. As shown in FIG. 1, preferably the user data input means includes a keyboard 132, a thumbwheel 148 and an escape key 160. Preferably, the keyboard 132 comprises a backlit keyboard. Further, preferably the backlight for the keyboard 132 is operable independently of the backlight for the display 122.

Typically, the handheld computing device 100 is a two-way wireless communication device having at least voice and data communication capabilities. Further, preferably the handheld computing device 100 has the capability to communicate with other computer systems on the Internet. Depending on the exact functionality provided, the wireless handheld computing device 100 may be referred to as a data messaging device, a two-way pager, a wireless e-mail device, a cellular telephone with data messaging capabilities, a wireless Internet appliance, or a data communication device, as examples.

Figure 3:
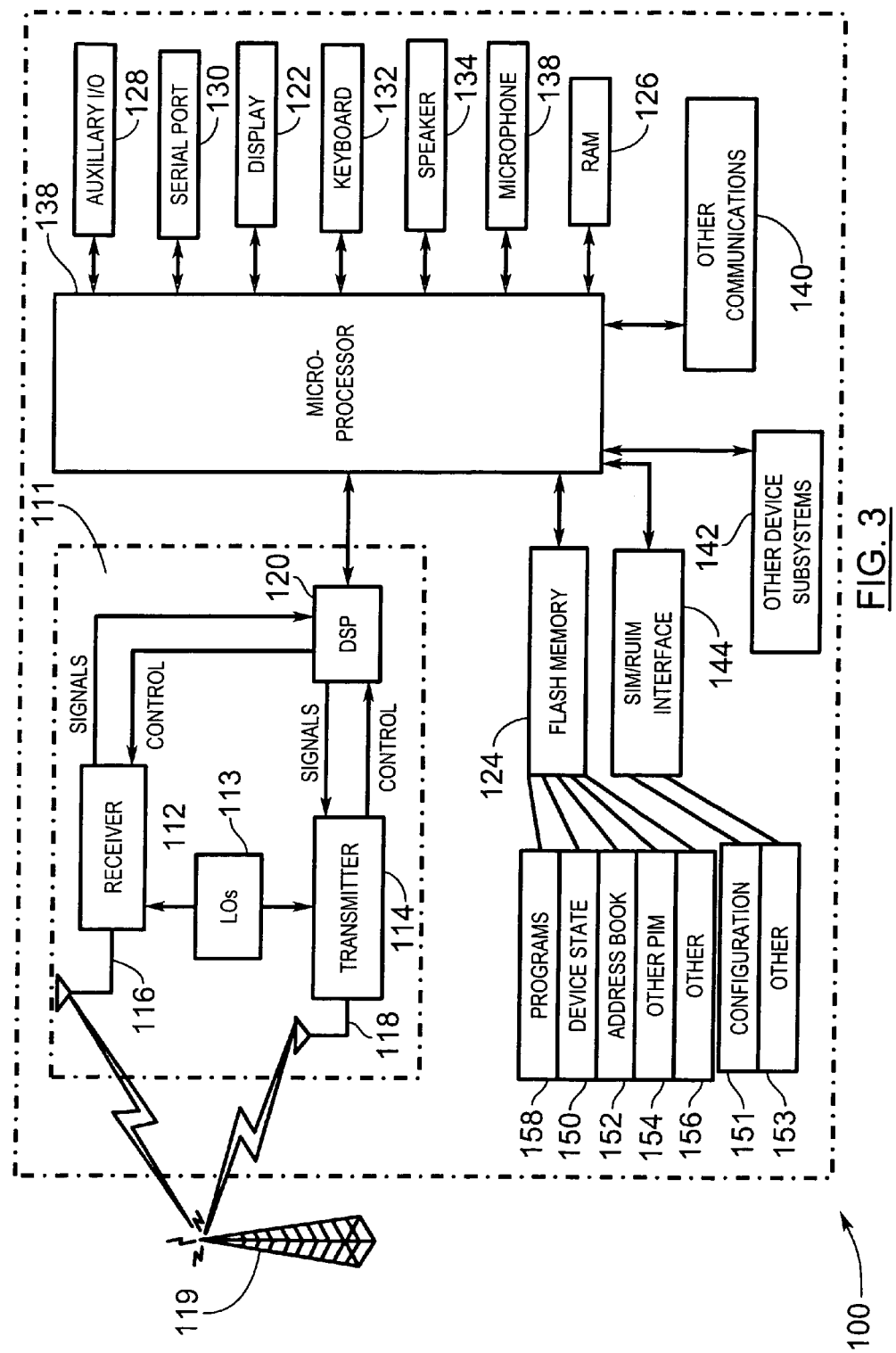
FIG. 3 is a schematic view depicting functional details of the handheld computing device

FIG. 3 depicts frictional details of the handheld computing device 100. Where the handheld computing device 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the handheld computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, the handheld computing device 100 is registered on the network using a unique identification number associated with each handheld computing device. In UMTS and GPRS networks, and in some CDMA networks, however, network access is associated with a subscriber or user of the handheld computing device 100. A GPRS handheld computing device therefore requires a subscriber identity module (SIM) card in order to operate on a GPRS network, and a RUIM in order to operate on some CDMA networks. Without a valid SIM/RUIM card, a GPRS/UMTS/CDMA handheld computing device may not be fully functional. Local or non-network communication functions, as well as legally required functions (if any) such as "911" emergency calling, may be available, but the handheld computing device 100 will be unable to carry out any other functions involving communications over the network. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation methods have been completed, the handheld computing device 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The handheld computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 3 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. The operating system software comprises computer processing instructions which, when accessed from the flash memory 124 and the RAM 126 and executed by the microprocessor 138, define the aforementioned data processing means 102. Received communication signals may also be stored in RAM 126.

As shown, the flash memory 124 can be segregated into different areas for both computer programs 158 and program data storage 150, 152, 154 and 156. These different storage types indicate that each program can allocate a portion of flash memory 124 for their own data storage requirements. Microprocessor 138, in addition to its operating system functions, preferably enables execution of software applications on the handheld computing device. A predetermined set of applications that control basic operations, including at least data and voice communication applications for example, will normally be installed on the handheld computing device 100 during manufacturing. A preferred software application may be a personal information manager (PIM) application having the ability to organize and manage data items relating to the user of the handheld computing device such as, but not limited to, e-mail, calendar events, voice mails, appointments, and task items. Naturally, one or more memory stores would be available on the handheld computing device to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the user's corresponding data items stored or associated with a host computer system. Further applications may also be loaded onto the handheld computing device 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the handheld computing device 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the handheld computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the handheld computing device 100 is similar, except that received signals would preferably be output to a speaker 134 and signals for transmission would be generated by a microphone 136. Alternative voice or audio I/O subsystems, such as a voice message recording subsystem, may also be implemented on the handheld computing device 100. Although voice or audio signal output is preferably accomplished primarily through the speaker 134, display 122 may also be used to provide an indication of the identity of a calling party, the duration of a voice call or other voice call related information for example.

Serial port 130 in FIG. 3, would normally be implemented in a personal digital assistant (PDA)-type handheld computing device for which synchronization with a user's desktop computer (not shown) may be desirable, but is an optional device component. Such a port 130 would enable a user to set preferences through an external device or software application and would extend the capabilities of the handheld computing device 100 by providing for information or software downloads to the handheld computing device 100 other than through a wireless communication network. The alternate download path may for example be used to load an encryption key onto the device through a direct and thus reliable and trusted connection to thereby enable secure device communication.

Other communications subsystems 140, such as a short-range communications subsystem, is a further optional component which may provide for communication between the handheld computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 4:
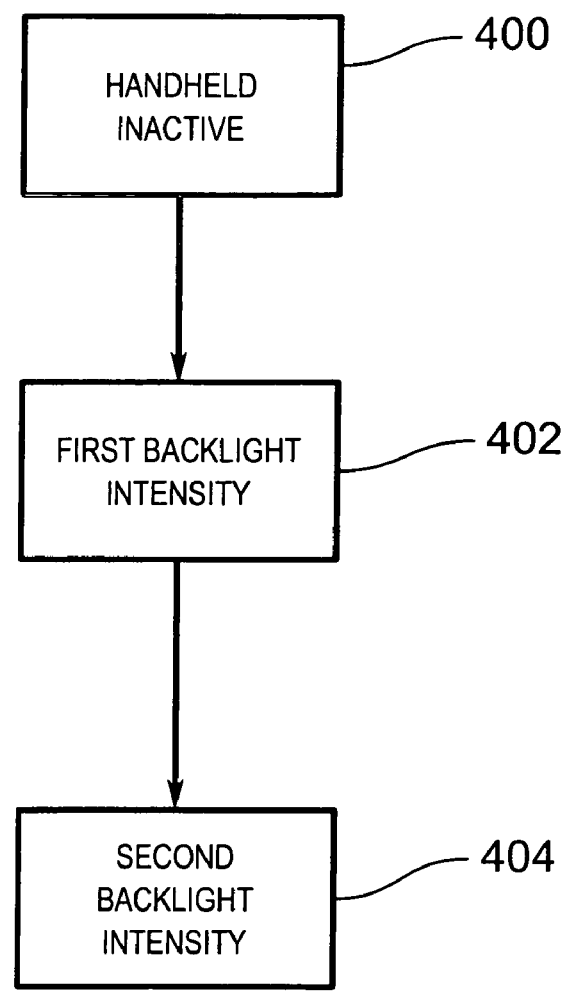
FIG. 4 is a flowchart depicting, by way of overview, the method of backlight control implemented in the handheld computing device.

FIG. 4 is a flow chart that depicts, by way of overview, the sequence of steps performed by the data processing means 102 according the invention. Initially, at step 400, the handheld computing device 100 is in, an inactive state, and the backlight is at a minimum/off intensity.

When the data processing means 102 exits from the inactive state, at step 402 the data processing means 102 sets the intensity of the backlight to a first intensity level that is sufficient for viewing information on the display under first ambient lighting conditions. Subsequently, if the user of the handheld computing device 100 activates the function key, at step 404 the data processing means 102 sets the intensity of the backlight to a second intensity level that is sufficient for viewing information on the backlit display under second ambient lighting conditions that are different than the first ambient lighting conditions.

In one embodiment, the backlit display 122 is a transmissive LCD display, and the function key 146 is a power on/off switch The backlight is set to a maximum intensity level so as to allow the user to view the information on the backlit display 122 under normal lighting conditions. Typically, the backlight is set to the maximum intensity level when the handheld computing device 100 exits the inactive state. However, if the user is operating the handheld computing device 100 under low light conditions, the user activates the power on/off switch 146, which causes the backlight to be set to a lower intensity so as to allow the user to view the information on the backlit display 122 under the low light conditions.

In another embodiment, the backlit display 122 is a reflective or trans-reflective LCD display, and the function key 146 is a backlight switch. The backlight is set to a low intensity level so as to allow the user to view the information on the backlit display 122 under normal lighting conditions. Typically, the backlight is set to the low intensity level when the handheld computing device 100 exits the inactive state. However, if the user is operating the handheld computing device 100 under low light conditions, the user activates the backlight switch 146, which causes the backlight to be set to a maximum intensity so as to allow the user to view the information on the backlit display 122 under the low light conditions.

Figure 5A:
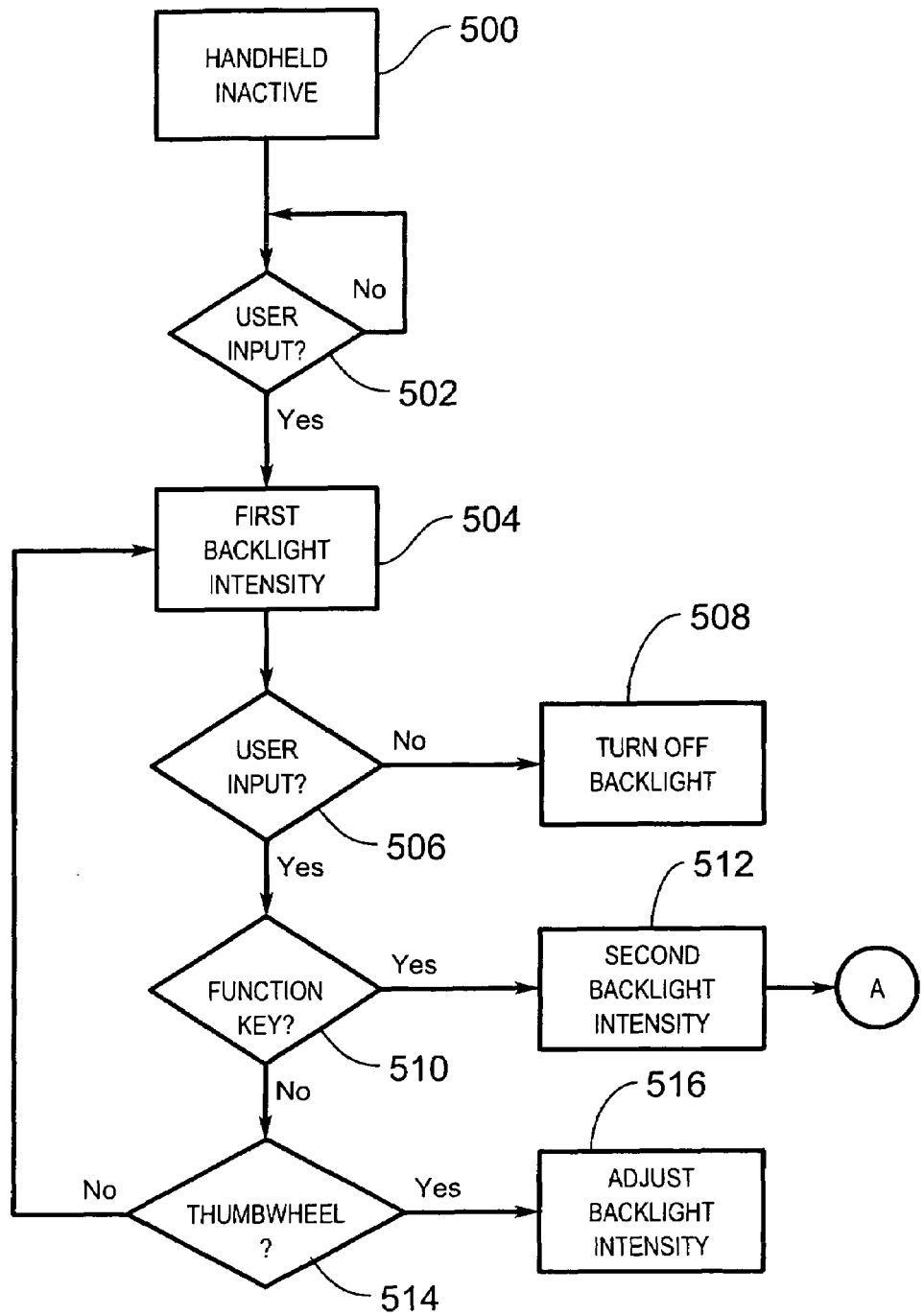
FIGS. 5a and 5b together comprise a flowchart depicting, in detail, the method of backlight control implemented in the handheld computing device.
Figure 5B:
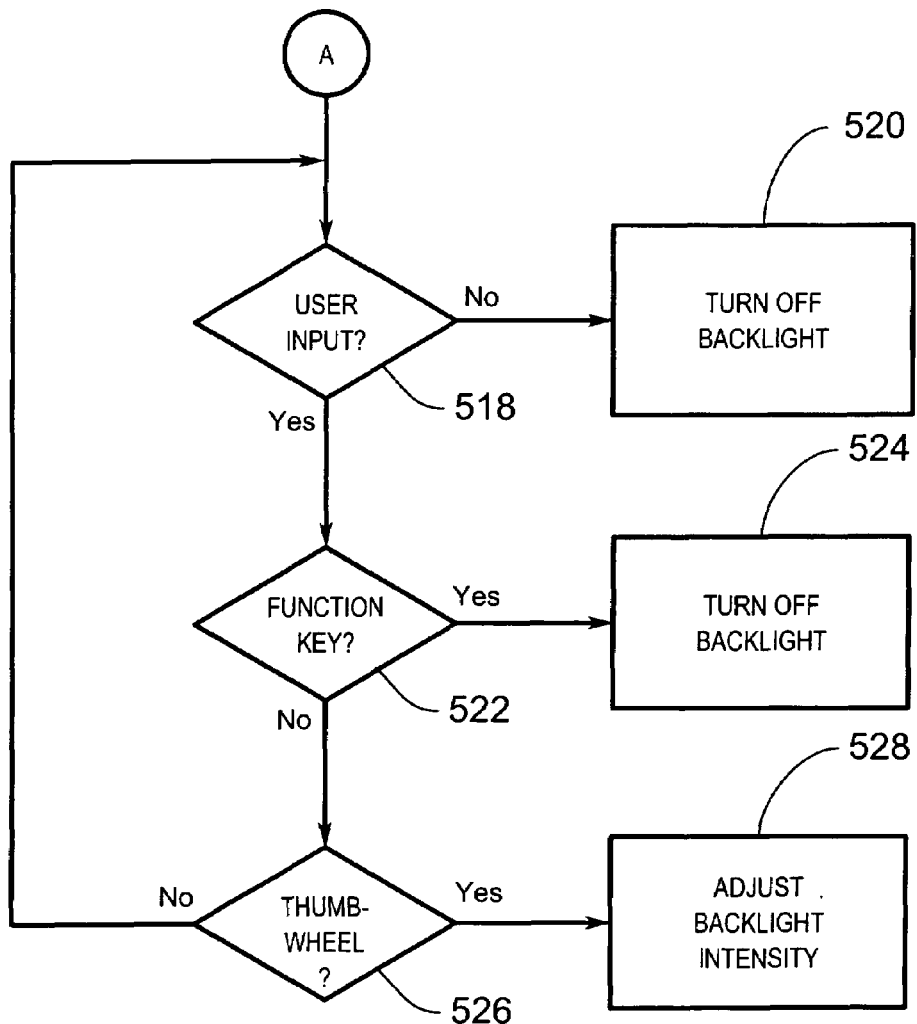

FIG. 5 is a flow chart that depicts, in detail, the sequence of steps performed by the data processing means 102. Initially, at step 500, the handheld computing device 100 is in an inactive state, such as a sleep state; and the backlight is at a minimum intensity, such as off.

If the user of the handheld computing device 100 presses a key on the keyboard 132, depresses the function key 146, rotates the thumbwheel 148 or depresses the escape key 160, at step 502 the data processing means 102 exits the inactive state. Alternately, in one variation, the data processing means 102 exits the inactive state in response to activity occurring on one of the computer programs 158. For instance, the data processing means 102 may exit the inactive state when an e-mail message or a telephone call is received on the handheld computing device 100.

Then, at step 504, the data processing means 102 sets the intensity of the backlight to a first intensity level. If the backlit display 122 is a transmissive LCD display, the first intensity level is the maximum backlight intensity. However, if the backlit display 122 is a reflective or trans-reflective LCD display, the first intensity level is an intensity lower than the maximum backlight intensity, but greater than the minimal/off intensity level. Both of these first intensity levels allow the user to view the information on the respective backlit displays 122 under normal lighting conditions.

Typically, at step 504, the data processing means 102 rapidly increases the intensity of the backlight from the minimum/off intensity level to the first intensity level so that the change in intensity appears substantially instantaneous to the user of the handheld computing device. However, in one variation, the data processing means 102 slowly increases the intensity of the backlight from the mini mum/off intensity level to the first intensity level. This variation is advantageous since, if the user is operating the handheld computing device 100 in a dim environment, a rapid change in backlight intensity would hurt the user's eyes. Further, the user of the handheld computing device 100 may interrupt the transition from the minimal/off intensity level to the first intensity level by depressing the function key 146, thereby setting the intensity of the backlight to the level subsisting at the instant the function key 146 was depressed.

While the backlight is set at its first intensity level, at step 506 the data processing means 102 determines whether a maximum predetermined period of time has elapsed during which the data processing means 102 has not detected any further activity from the user (eg. the user has not depressed a key on the keyboard 132, depressed the function key 146, rotated the thumbwheel 148 or depressed the escape key 160). The maximum predetermined period of time may be fixed, or may be based on activity detected in one of the computer programs 158 For instance, the data processing means 102 may use one predetermined period if the user is reviewing an e-mail message, but may use a different predetermined period if the user is receiving a telephone call on the handheld computing device 100.

If the data processing means 102 determines at step 506 that the maximum predetermined time period has elapsed without any activity from the user being detected, at step 508 the data input means 102 sets the intensity of the backlight back to the minimum/off intensity level. Typically, at step 508, the data input means 102 rapidly decreases the intensity of the backlight from the first intensity level back to the minimum/off intensity level so that the change in intensity appears substantially instantaneous to the user of the handheld computing device. However, in one variation, the data processing means 102 slowly decreases the intensity of the backlight from the first intensity level to the minimum/off intensity level. This variation is advantageous since, if the user is reviewing a lengthy message on the handheld computing device 100, the user is given notification to activate the data input means 102 to maintain the backlight on.

If, at step 506, the data processing means 102 detected user activity within the maximum predetermined time period, at step 510 the data processing means 102 determines whether the user depressed and released the function key 146 within the maximum predetermined time period. If the data processing means 102 determined at step 510 that the user depressed and released the function key 146 within the maximum predetermined time period, at step 512 the data processing means 102 sets the intensity of the backlight to a second intensity level.

If the backlit display 122 is a reflective or trans-reflective LCD display, the second intensity level is the maximum backlight intensity. However, if the backlit display 122 is a transmissive LCD display, the second intensity level is an intensity lower than the maximum backlight intensity, but greater than the minimal/off intensity level. Both of these second intensity levels allow the user to view the information on the respective backlit displays 122 under dim lighting conditions.

Typically, at step 512, the data input means 102 rapidly changes the intensity of the backlight from the first intensity level to the second intensity level so that the change in intensity appears substantially instantaneous to the user of the handheld computing device. However, in one variation, the data processing means 102 slowly changes the intensity of the backlight from the first intensity level to the second intensity level. Further, the user of the handheld computing device 100 may interrupt the transition from the first intensity level to the second intensity level by depressing the function key 146, thereby setting the intensity of the backlight to the level subsisting at the instant the function key 146 was depressed.

Alternately, at step 514 the data processing means 102 determines whether the user has depressed/held the function key 146 while rotating the thumbwheel 148 within the maximum predetermined time period. If the data processing means 102 determined at step 514 that the user depressed/held the function key 146 while rotating the thumbwheel 148 within the maximum predetermined time period, at step 516 the data input means 102 sets the intensity of the backlight to an intermediate intensity level that is less than the first intensity level, based on the extent of angular rotation of the thumbwheel 148. Otherwise, the data processing means 102 maintains the intensity of the backlight at the first intensity level.

While the backlight is set at the second intensity level at step 518 the data processing means 102 determines whether the maximum predetermined time period has elapsed during which the data processing means 102 has not detected any further activity from the user (eg. the user has not depressed a key on the keyboard 132, depressed the function key 146, rotated the thumbwheel 148 or depressed the escape key 160). As discussed above, the maximum predetermined period of time may be fixed, or may be based on activity detected in one of the computer programs 158.

If the data processing means 102 determines at step 518 that the maximum predetermined time period has elapsed without any further activity from the user being detected, at step 520 the data input means 102 sets the intensity of the backlight back to the minimum/off intensity level.

Typically, at step 520, the data input means 102 rapidly decreases the intensity of the display backlight from the second intensity level back to the minimum/of intensity level so that the change in intensity appears substantially instantaneous to the user of the handheld computing device. However, in one variation, the data processing means 102 slowly decreases the intensity of the backlight from the second intensity level to the minimum/off intensity level as a warning to the user, as discussed above.

If, at step 518, the data processing means 102 detected user activity within the maximum predetermined time period, at step 522 the data processing means 102 determines whether the user depressed and released the function key 146 within the maximum predetermined time period. If the data processing means 102 determined at step 522 that the user depressed and released the function key 146 within the maximum predetermined time period, at step 524 the data input means 102 sets the intensity of the backlight back to the minimum/off intensity level.

Alternately, at step 526 the data processing means 102 determines whether the user has depressed/held the function key 146 while rotating the thumbwheel 148 within the maximum predetermined time period If the data processing means 102 determined at step 526 that the user depressed/held the function key 146 while rotating the thumbwheel 148 within the maximum predetermined the period, at step 528 the data input means 102 sets the intensity of the backlight to an intensity level that is less than the second intensity level, based on the extent of angular rotation of the thumbwheel 148.

Otherwise, the data processing means 102 maintains the intensity of the backlight at the second intensity level. Further, in one variation, if the data processing means 102 determined at this step that the user had depressed a key on the keyboard 132, preferably the data processing means 102 also turns the backlit keyboard 132 on.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. In a handheld computing device that includes a backlit display having a variable-intensity backlight, user data input means, and a function key, the user data input means comprising a thumbwheel, a method for controlling an intensity of light produced by the backlight comprising the steps of:
   (1) setting the intensity to a first level sufficient for viewing information on the display under first ambient lighting; and
   (2) upon activation of the function key, setting the intensity to a second level sufficient for viewing information on the backlit display under second ambient lighting different than the first ambient lighting;
   the method further comprising decreasing the intensity from one of the first intensity level and the second intensity level in accordance with a user rotation of the thumbwheel.

2. The method according to claim 1, wherein the first intensity level setting step comprises setting the intensity to the first level upon exit of the handheld computing device from an inactive state.

3. The method according to claim 2, wherein the handheld computing device exits the inactive state upon activation of one of the function key and the user data input means.

4. The method according to claim 2, wherein the handheld computing device exits the inactive state upon occurrence of a trigger event.

5. The method according to claim 2, wherein the first intensity level setting step further comprises gradually increasing the intensity from a minimum intensity level to the first level upon the exit from the inactive state.

6. The method according to claim 5, wherein the step of gradually increasing the intensity comprises gradually increasing the intensity upon the activation of the one of the function key and the user data input means.

7. The method according to claim 6, wherein the activated user data input means comprises one of a data input key, and the thumbwheel.

8. The method according to claim 2, further comprising the step of setting the intensity to a minimum intensity level upon expiry of a predetermined elapsed time of non-activity from the user data input means.

9. The method according to claim 8, wherein the minimum intensity level setting step comprises gradually decreasing the intensity to the minimum level upon the expiry of the predetermined elapsed time.

10. The method according to claim 8, wherein the predetermined elapsed time is determined in accordance with activity of a software application provided on the handheld computing device.

11. The method according to claim 1, wherein the step of setting the intensity to a second level comprises gradually transitioning the intensity from the first intensity level to the second intensity level.

12. The method according to claim 11, wherein the user data input means includes a backlit keyboard, and the method further comprises the step of illuminating the backlit keyboard upon activation of the function key.

13. The method according to claim 11, wherein the first ambient lighting is brighter than the second ambient lighting.

14. A handheld computing device, comprising:
a backlit display having a variable-intensity backlight;
user data input means, the user data input means comprising a
thumbwheel,
a function key; and
data processing means coupled to the backlit display, the user data input means and the function key, the data processing means being configured to perform the steps of:
   (1) setting the intensity to a first level sufficient for viewing information on the display under first ambient lighting; and
   (2) upon activation of the function key, setting the intensity to a second level sufficient for viewing information on the backlit display under second ambient lighting different than the first ambient lighting,
the data processing means being further configured to perform the step of decreasing the intensity from one of the first intensity level and the second intensity level in accordance with a user rotation of the thumbwheel.

15. The handheld computing device according to claim 14, wherein the user data input means includes a backlit keyboard, and the data processing means is configured to perform the step of illuminating the backlit keyboard upon activation of the function key.

16. The handheld computing device according to claim 15, wherein the first ambient lighting is brighter than the second ambient lighting.

17. The handheld computing device according to claim 14, wherein the data processing means is configured to perform the first intensity level setting step upon exit of the handheld computing device from an inactive state.

18. The handheld computing device according to claim 17, wherein the handheld computing device is configured to exit the inactive state upon activation of one of the function key and the user data input means.

19. The handheld computing device according to claim 17, wherein the handheld computing device is configured to exit the inactive state upon occurrence of a trigger event.

20. The handheld computing device according to claim 17, wherein the data processing means is configured to perform the first intensity level setting step by gradually increasing the intensity from a minimum intensity level to the first level upon the exit from the inactive state.

21. The handheld computing device according to claim 20, wherein the data processing means is configured to perform the gradually increasing step by gradually increasing the intensity upon the activation of the one of the function key and the user data input means.

22. The handheld computing device according to claim 21, wherein the activated user data input means comprises one of a data input key, and the thumbwheel.

23. The handheld computing device according to claim 17, wherein the data processing means is further configured to perform the step of setting the intensity to a minimum intensity level upon expiry of a predetermined elapsed time of non-activity from the user data input means.

24. The handheld computing device according to claim 23 wherein to data processing means is configured to perform the minimum intensity level setting step by gradually decreasing the intensity to the minimum level upon the expiry of the predetermined elapsed time.

25. The handheld computing device according to claim 23 wherein the handheld computing device includes at least one software application, and the data processing means is configured to determine the extent of the predetermined elapsed time in accordance with activity of the at least one software application.

26. The handheld computing device according to claim 15, wherein the backlit display comprises a reflective LCD panel, and the function key comprises a backlight key.

27. The handheld computing device according to claim 15, wherein the backlit display comprises a transmissive LCD panel, and the function key comprises a power switch.

28. The handheld computing device according to claim 15, wherein the handheld computing device comprises a wireless handheld computing device.

29. A computer-readable medium including computer processing instructions for a processing unit of a handheld computing device, the handheld computing device including a backlit display having a variable-intensity backlight, user data input means, and a function key, the user data input means comprising a thumbwheel, the computer processing instructions when executed by the processing unit causing the handheld computing device to perform the steps of:
 (1) upon exit of the handheld computing device from an inactive state, setting the intensity to a first level sufficient for viewing information on the display under first ambient lighting; and
 (2) upon activation of the function key, setting the intensity to a second level sufficient for viewing information on the backlit display under second ambient lighting different than the first ambient lighting;

the computer processing instructions further causing the handheld computing device to decrease the intensity from one of the first intensity level and the second intensity level in accordance with a user rotation of the thumbwheel.

30. The computer-readable medium according to claim 29, wherein the first intensity level setting step further comprises gradually increasing the intensity from a minimum intensity level to the first level upon the exit from the inactive state.

31. The computer-readable medium according to claim 30, wherein the step of gradually increasing the intensity comprises gradually increasing the intensity upon the activation of the one of the function key and the user data input means.

32. The computer-readable medium according to claim 29, further comprising the step of setting the intensity to a minimum intensity level upon expiry of a predetermined elapsed time of non-activity from the user data input means, and the minimum intensity level setting step comprises gradually decreasing the intensity to the minimum level upon the expiry of the predetermined elapsed time.

33. The computer-readable medium according to claim 32, wherein the predetermined elapsed time is determined in accordance with activity of a software application provided on the handheld computing device.

* * * * *